United States Patent
Henftling et al.

(10) Patent No.: US 6,911,934 B2
(45) Date of Patent: Jun. 28, 2005

(54) APPARATUS, METHOD AND ARTICLES OF MANUFACTURE FOR SEQUENTIAL LOBING HIGH RESOLUTION RADAR

(75) Inventors: Hermann Henftling, Mainstockheim (DE); Dirk Klotzbuecher, Wurburg (DE)

(73) Assignee: M/A-Com, Inc., Lowell, MA (US)

( * ) Notice: Subject to any disclaimer, the term of this patent is extended or adjusted under 35 U.S.C. 154(b) by 0 days.

(21) Appl. No.: 10/663,102

(22) Filed: Sep. 16, 2003

(65) Prior Publication Data

US 2005/0057393 A1 Mar. 17, 2005

(51) Int. Cl.[7] .............................................. G01S 13/42
(52) U.S. Cl. ........................ 342/28; 342/79; 342/107; 342/109; 342/113; 342/114; 342/115; 342/127; 342/133; 342/139; 342/146; 342/194
(58) Field of Search ............................ 342/28, 62, 63, 342/68, 70–72, 79, 80, 107, 109, 111, 113–116, 127, 133, 134, 139, 141, 146, 147, 149, 152, 155, 192, 194, 196

(56) References Cited

U.S. PATENT DOCUMENTS

| | | | | |
|---|---|---|---|---|
| 2,946,049 A | * | 7/1960 | Stotz ........................ 342/77 |
| 3,274,590 A | * | 9/1966 | Page ........................ 342/80 |
| 3,460,140 A | * | 8/1969 | Logan ....................... 342/157 |
| 4,006,478 A | * | 2/1977 | Lewis et al. ............... 342/15 |
| 4,219,812 A | * | 8/1980 | Rittenbach ................. 342/110 |
| 4,430,655 A | * | 2/1984 | Rittenbach ................. 342/155 |
| 5,093,666 A | * | 3/1992 | Jamison ..................... 342/150 |
| 6,825,797 B2 | * | 11/2004 | Ishii et al. ................. 342/70 |
| 6,839,017 B1 | * | 1/2005 | Dillman ..................... 342/16 |

* cited by examiner

Primary Examiner—John B. Sotomayor

(57) ABSTRACT

A sensor front end that is able to discriminate objects based on their range from the sensor and to derive bearing information therefrom. The sensor system may include a signal source for generating source signal; an antenna system for transmitting the source signal to and receiving a reflected signal from the object; wherein the antenna system is configured for introducing a phase shift into either the source signal or the reflected signal to create a plurality of signal patterns; and an information processor programmed to receive the reflected signal and to determine bearing information for the object based on position and phase information in the plurality of signal patterns.

20 Claims, 9 Drawing Sheets

APPARATUS, METHOD AND ARTICLES OF MANUFACTURE FOR SEQUENTIAL LOBING HIGH RESOLUTION RADAR

FIELD OF THE INVENTION

The field of the invention concerns systems for determining bearing and velocity information for an object using phase discriminating radar, and more particularly to apparatus, methods, and articles of manufacture that utilize sequential lobing radar signals for determining bearing and velocity information for an object.

BACKGROUND OF THE INVENTION

Proximity sensors of various types are used in a variety of applications in which the distance to an object and, in some circumstances, the velocity of that object relative to the sensor are to be determined. This data can be provided to a processing system that analyzes the received data and determines if a safety threshold has been exceeded. If a safety threshold has been exceeded, the processor can determine if an alarm is to be set or other action taken. Proximity sensors are used, for example, in a variety of applications that can include burglar alarms, obstacle detection, and automobiles. Proximity sensors in automobiles can be used to determine the relative position and relative velocity of other automobiles or objects in the vicinity of the automobile. In an automobile system this position and velocity data may be used, for example, to adjust the velocity of the automobile while operating under cruise control, to apply a portion of the available brake energy to slow the vehicle down, or to provide an auditory or visual alarm indication to the driver.

It is also beneficial in these systems to be able to determine the bearing at which the object is approaching the automobile. The sensor must also be physically small, lightweight, highly reliable, and low cost. The system requirements for these sensors are often quite stringent both in terms of the technical performance of the sensor and in the physical and economic factors as well. The more complex the sensor, the larger the parts count, and concomitantly, the higher the cost, the higher the mass, the larger the physical volume of the sensor, and the lower the reliability of the sensor.

Therefore, it would be advantageous to provide a sensor system that is able to discriminate objects that are within a specified range from objects that are outside of this range, and that is able to determine the bearing at which objects are approaching the automobile.

BRIEF SUMMARY OF THE INVENTION

Embodiments of the invention include a sensor system that is able to discern objects based on their range from the sensor. The sensor system may include a signal source for generating a source signal; an antenna system for transmitting the source signal to and receiving a reflected signal from the object; wherein the antenna system is configured for introducing a phase shift into either the source signal or the reflected signal to create a plurality of signal patterns; and an information processor programmed to receive the reflected signal and to determine bearing information for the object based on position and phase information in the plurality of signal patterns.

Bearing information may be determined by receiving a signal reflected from the object, wherein the signal has a reference signal pattern and an error signal pattern produced by introducing a predetermined phase shift into a portion of the signal; determining a reference amplitude and phase and an error amplitude and phase from the signal; determining a phase difference between the reference phase and the error phase, the phase difference having a sign of positive or negative, or a phase difference of zero; and calculating the bearing information using the reference amplitude, the error amplitude, and the sign of said channel phase difference.

Other forms, features and aspects of the above-described methods and system are described in the detailed description that follows.

BRIEF DESCRIPTION OF THE DRAWINGS

The invention will be more fully understood from the following detailed description taken in conjunction with the accompanying drawings in which.

DETAILED DESCRIPTION OF THE INVENTION

A high resolution radar ("HRR") system is disclosed that is able to determine the bearing, distance, and velocity of objects utilizing sequential lobing of the radar signals. Bearing determining capability is added to the HRR system without the need of an additional IQ-mixer. In one embodiment, the transmitting and/or receiving antenna may be replaced by a switchable antenna array. The signal wave characteristic may be switched sequentially between at least two different patterns, such as a reference pattern and an error pattern. A switchable phase shifter may be used, for example, between two antenna arrays to create 0° and 180° phaseshifts, resulting in these reference and error signal patterns. These resulting patterns may have a focused beam at bore sight and a notch at bore sight, respectively. Using monopulse theory, it is possible to extract bearing information by processing the return signals of both sensor stages. Smart signal processing enables defining a object area proximity.

Figure 1A:
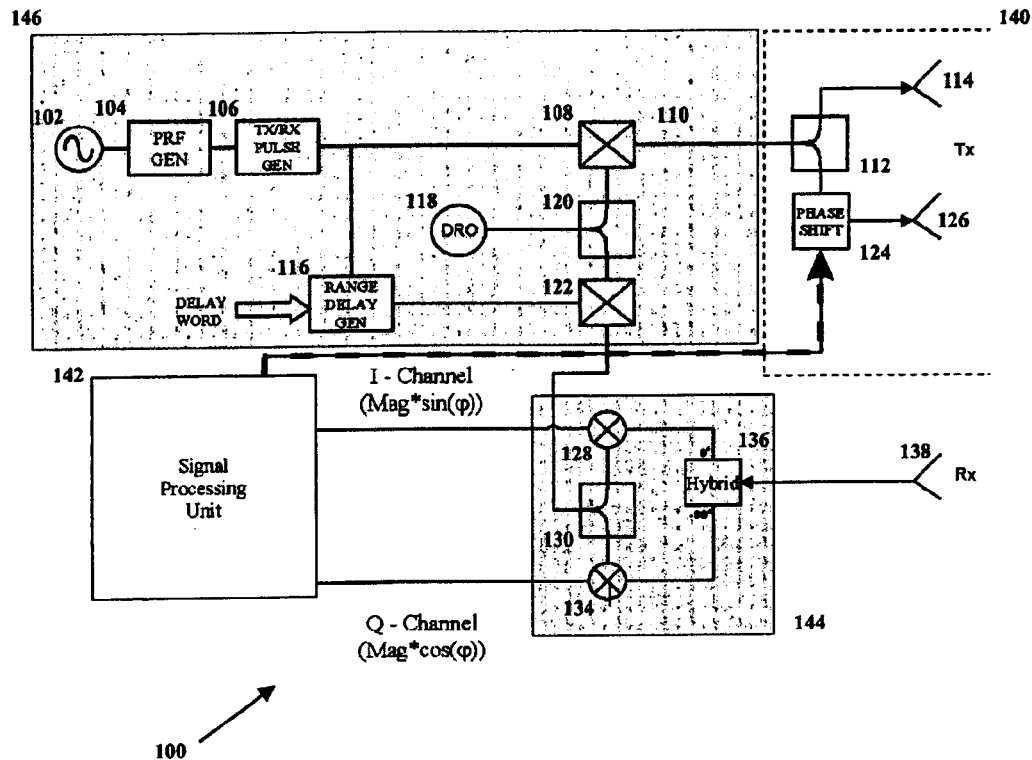
FIGS. 1(a)–(b) illustrate an embodiment of a high resolution radar system.
Figure 1B:
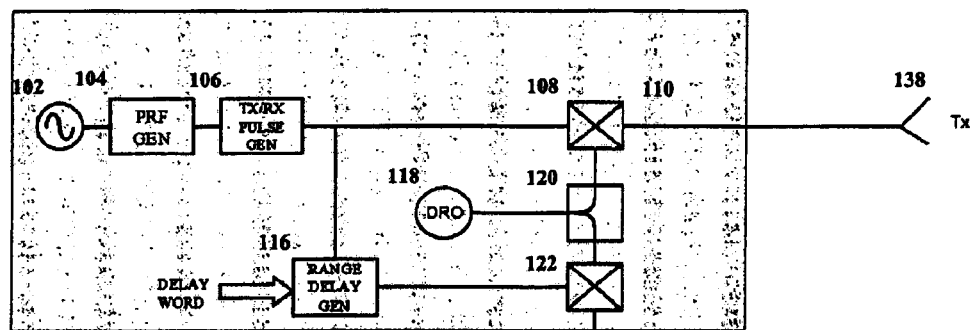

Turning to the embodiments illustrated in FIGS. 1(a)–(b), an HHR architecture (146) used with the invention may incorporate a modulator driver (102), as shown, as the input to a transmit gate (106) and a receive gate (116). The pulse repetition frequency generator (PRF), i.e., modulator driver (102), may send a signal to both the transmit and receive channels of the HRR system. The transmitter channel may generate a transmission signal via pulse modulator (108), while the signal delivered to pulse modulator (122) of the receive channel may be delayed. The use and operation of the HRR architecture may be as further described in U.S. Pat. No. 6,067,040, hereby incorporated by reference herein.

The pulsed nature of the transmit signal as well as the input at the local oscillator from the pulse modulator may be affected by the mixing of the signals from the modulator driver (102), delayed in the case of the receive channel, with the output of the continuous wave source (118). Continuous wave source (118) may be preselected depending on application, but it is anticipated that the frequency of the continuous wave source (118) is in the microwave to millimeter range, for example, approximately 24 GHz in frequency.

Output from the receive channel pulse modulator (122) may be used to generate the local oscillator signal that is mixed with the received signal from the reflection from an object at a given range R. In an application where the object is moving with respect to the radar system, the delay may remain fixed, commensurate with a given range, or the range may be electronically varied to effect range scanning or object tracking. The Doppler signal may be recovered via multiple samples of the signal present at a particular range.

Continuous wave source (118) may emit a continuous wave signal to pulse modulator (108), which may be mixed or multiplied with input from a signal from a modulator driver (102). This signal may be passed through a band pass filter (BPF) (110), and then transmitted by transmission antenna 140. In one embodiment, transmission antenna 140 comprises signal splitter (112) connected to array (114) and array (126), and splitting the source signal therebetween. A switchable phase shifter (124) may be included between switch (112) and array (126) in order to alternatively shift the phase of the signal transmitted from array (126) relative to array (114), such as between by 0° and 180°, for example, to create the aforementioned reference and error signal patterns. Alternatively, signal splitter (112), array (114), array (126), and phase shifter (124) may be incorporated into receiving antenna (148). Those of ordinary skill in the art will also appreciate that a single antenna may be used for both transmitting and receiving, and that the invention is not limited.

Figure 2A:
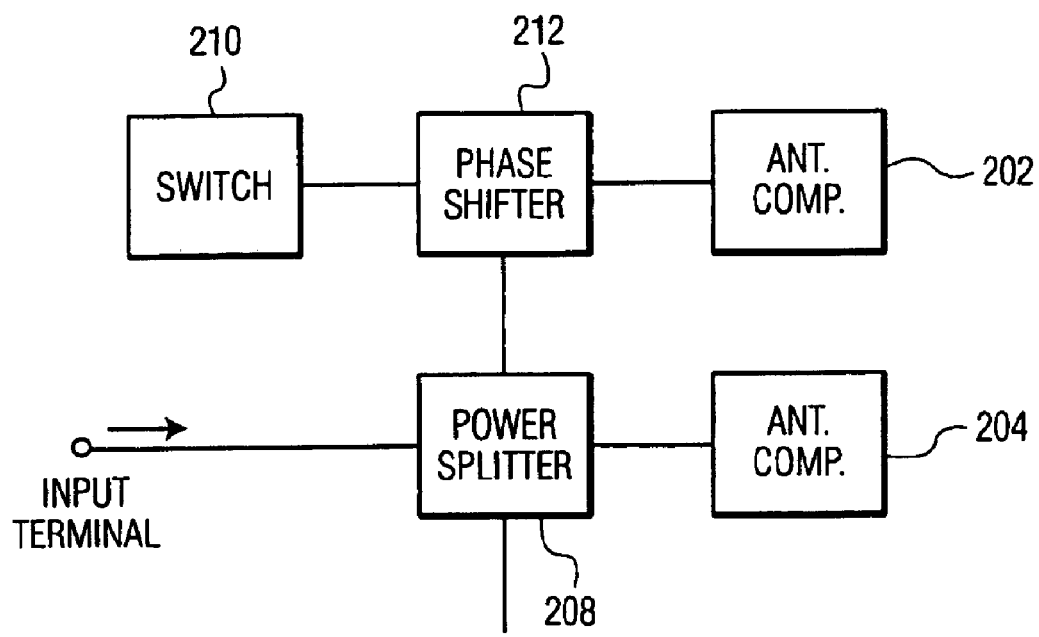
FIGS. 2(a)–(c) illustrates embodiments of an antenna.
Figure 2B:
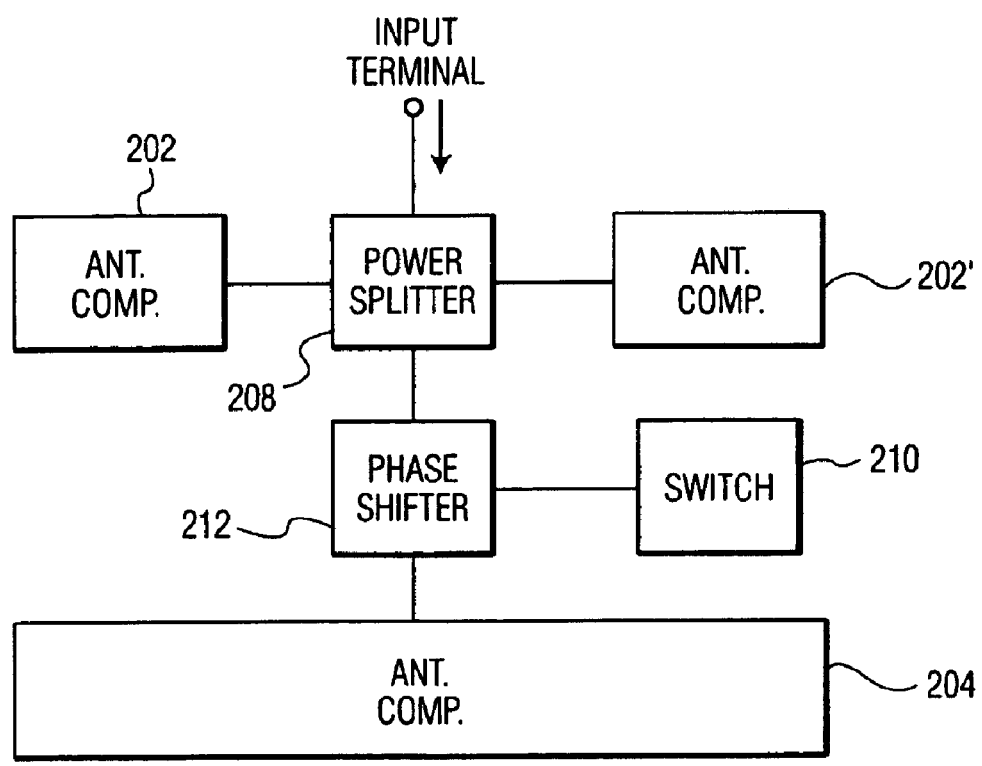
Figure 2C:
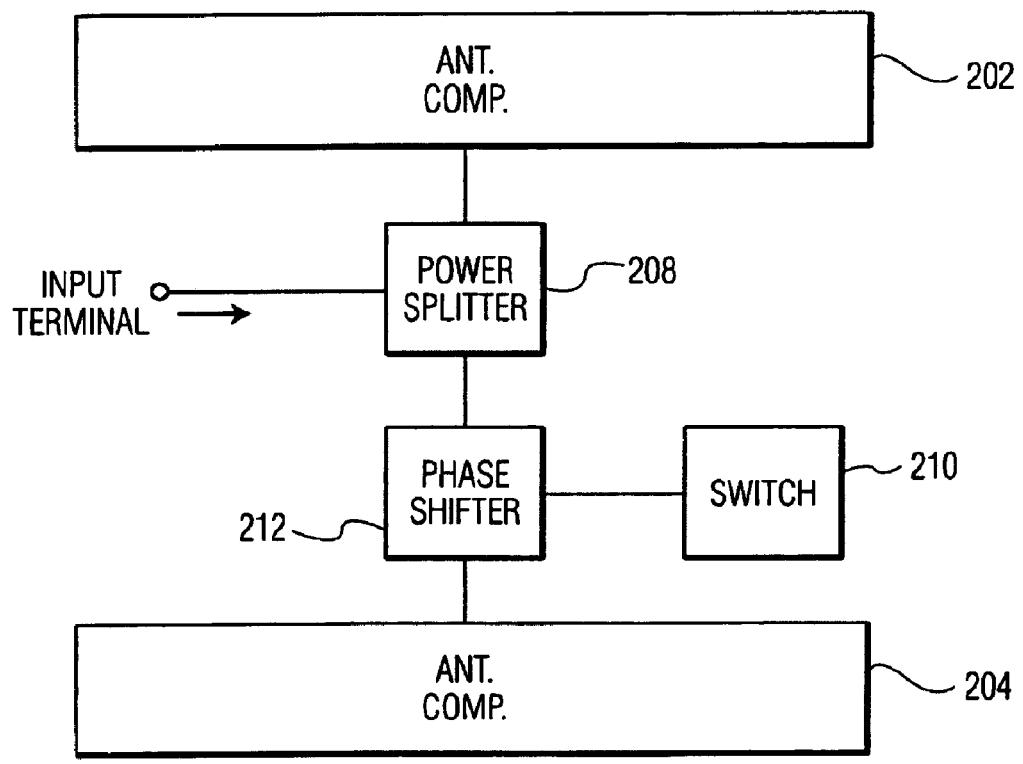

One manner in which the antennas may be configured is illustrated in FIGS. 2(a)–(c). In the general embodiment as shown in FIG. 2(a), the antenna system may comprise a plurality of antenna components 202 and 204. For example, a feed network of an aperture coupled patch antenna array may comprise two rows of array elements. Of course, the invention is not limited. A power splitting device (208) (such as a transformer, hybrid, etc.) may be used to define an amplitude ratio between the two antenna components and to impedance match antenna (140) (FIGS. 1(a)–(b)) to the input terminal. A portion of the energy at the input terminal may be split into (or received from) antenna component (202), while the remaining portion of the of the signal energy may reach second antenna component (204) with an absolute phase difference of, for example, either 720° or 900°, (with a relative phase difference of 0° or 180°), depending on the system design.

Phaseshifting may be accomplished in this embodiment using a phaseshifter (212), which may be controlled by switch (210). Switch (210) may be controlled, for example, by signal processing unit (142) (FIGS. 1(a)–(b)) in a conventional manner, such as by using appropriate switching transistors and biasing circuitry. Phaseshifter (212) is not particularly limited and may comprise any component capable of introducing a phase shift into the transmitted or received signal, such as a 180° rat race formed from a microstrip, a coaxial phase shifter, a switched waveguide elements, etc.

Some alternative, particular embodiments of this general embodiment are further illustrated in FIGS. 2(b) and 2(c). FIG. 2(b) illustrates a serial approach to the antenna system. As shown in FIG. 2(b), in this embodiment, antenna component 202 may be split into two components. For example, one half of the array power may be passed to each of antenna components 202 and 204. One quarter of the antenna power maybe split among two portions of antenna component 202. FIG. 2(c), illustrates a parallel approach to the antenna system. In the embodiment shown in FIG. 2(c), one half of the power is equally split across the two antenna components.

Figure 1B:
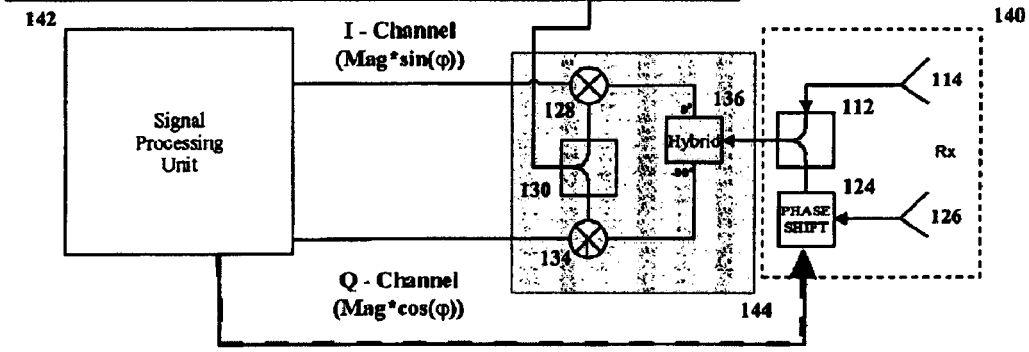

Returning to FIG. 1, the output of pulse modulator (122) may be input to a second power splitter (130) of I,Q mixer (144), which may input a signal to a first mixer (128) and a second mixer (134). A quadrature power splitter (136) may be connected to antenna (138), which receives the reflected signal from the object. Those of ordinary skill in the art will appreciate that antenna (138) is not particularly limited, and may comprise any antenna or antenna array capable of receiving the reflected signal in the manner of the invention, such as a switchable, phaseshifting antenna, as described above. Quadrature power splitter (136) may have a relative phase shift of π/2 radians, or a minus 90° phase shift. This results in the signal into mixer (134) being shifted by π/2 relative to the mixer (128). The output from mixers (128) and (134) may be fed into the I-channel and Q-channel of the receiver, respectively. The use of quadrature detection systems in general is known in the art and is described in more detail in the aforementioned U.S. Pat. No. 6,067,040.

The quadrature signals from I-channel and Q-channel may be inputted to signal processing unit (142). Signal processing unit (142) is capable of receiving and processing the quadrature signals. While the components of signal processing unit (142) are not limited, they may comprise, for example, a microprocessor (such as a digital signal processor), timing circuits and memory, such as in an integrated circuit, which are programmed to process the quadrature signals (such as by software incorporating fast Fourier transforms), although not limited thereto.

All of the HRR radar components for the various elements in the high resolution HRR radar system may be semiconductor based, with the exception of the antenna, although the invention is not limited thereto. Furthermore, the various implementations may include monolithic and heterolithic, glass based, and the like—other devices well known to the those of ordinary skill are also envisioned. For example, microwave source (118) may be realized in a number of frequency bands using GUNN, bipolar or gallium arsenide transistors, all of which are commercially available. The microwave source is usually a very important component from both a performance and cost perspective.

The receiver mixers (128, 134) may make use of Schottky diodes, which may be based in silicon or gallium arsenide. Several mixers in a number of frequency bands are commercially available for this purpose, and are well known to one of ordinary skill in the art. The various gating elements, amplifier elements and filter elements as well as the detector for the device as shown in the figures may comprise standard devices well known to one of ordinary skill in the art. Furthermore, the transmit and receive antennas may be formed from standard antenna arrays well known to one of ordinary skill in the art. Pulse modulators (108, 122) may comprise an RF switch utilizing field effect transistor (FET) switches, Schottky diodes, PIN diodes, etc., which are switched to an off mode using the narrow pulse developed by the step recovery diode. The drive to the step recovery diode may be generated by a low cost CMOS inverter available in surface mount device form at a substantially low cost in volume. The RF switch may be implemented using 0.10, 0.25, or 0.5 micron FETs, depending upon the application frequency.

Figure 3:
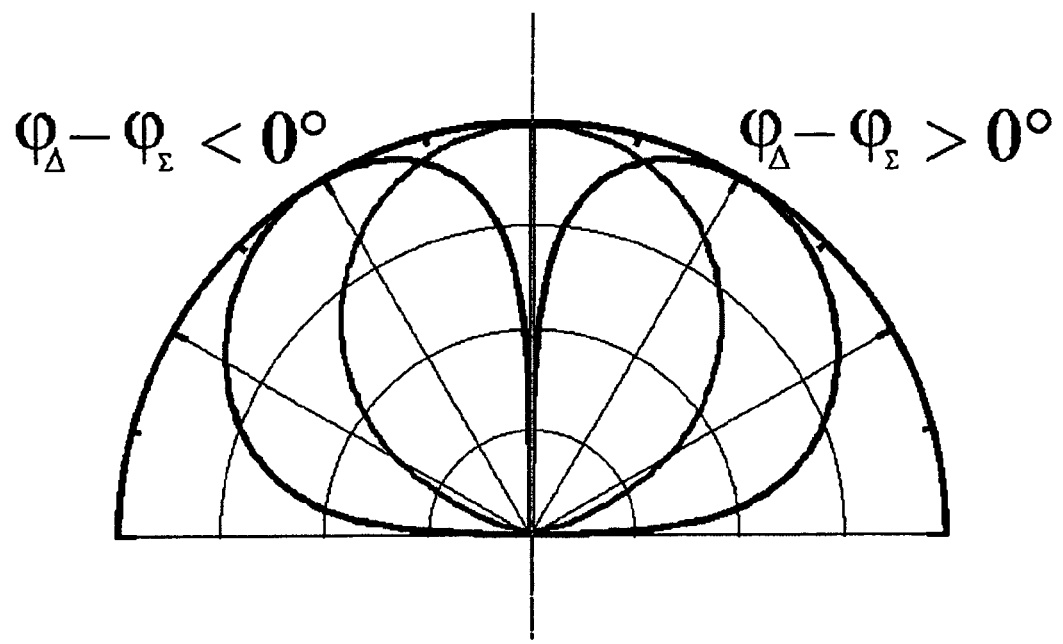
FIG. 3 illustrates a reference and error signal pattern.

Signals transmitted and/or received by the system may have alternate reference and error patterns that are phase shifted by 180° in the manner previously described. An example of these patterns, is illustrated in FIG. 3. In the first stage pattern, the signal energy is substantially focussed towards the bore-sight. In the second stage, a deep notch is provided at 0°. Having a pole at 0° provides the significant advantage of distinguishing the object position on the left or right side of the sensor. The reference pattern may be obtained by feeding both antenna rows in phase, while the error pattern may be gained by one row with a wave that is 180° out of phase with the other.

Transmitted signals are reflected from the object and received by antenna (138). The reflected wave signals are split into quadrature signals and provided to signal processing unit (142), as described above. The signal information may then be processed, for example to detect the presence of a target object, its range, its error angle, θ, and the complex amplitude of the target for both the reference and error channels. An example of how this may be accomplished is also discussed in the aforementioned U.S. Pat. No. 6,067,040.

The bearing information for the object may be determined using calculations based upon the theory of an amplitude sensing monopulse, which may be programmed into signal processing unit (142). The amplitude characteristic (e.g., magnitude) of the antenna pattern may then be used to determine the angular position of the detected object. Because the reference and error signal patterns are symmetric around the boresight axis, the phase conditions of the signal may be used to obtain the sign of the target angle, Θ, and determine the bearing of the object.

An additive sensing ratio ("ASR") for the measurement of the target angle, Θ, may be determined from the equation:

$$ASR = \frac{S_{err} - S_{ref}}{S_{err} + S_{ref}} \qquad \text{Equation 1}$$

where $S_{err}$ and $S_{ref}$ correspond to the magnitudes of both the sum and difference channels, respectively.

Figure 4:
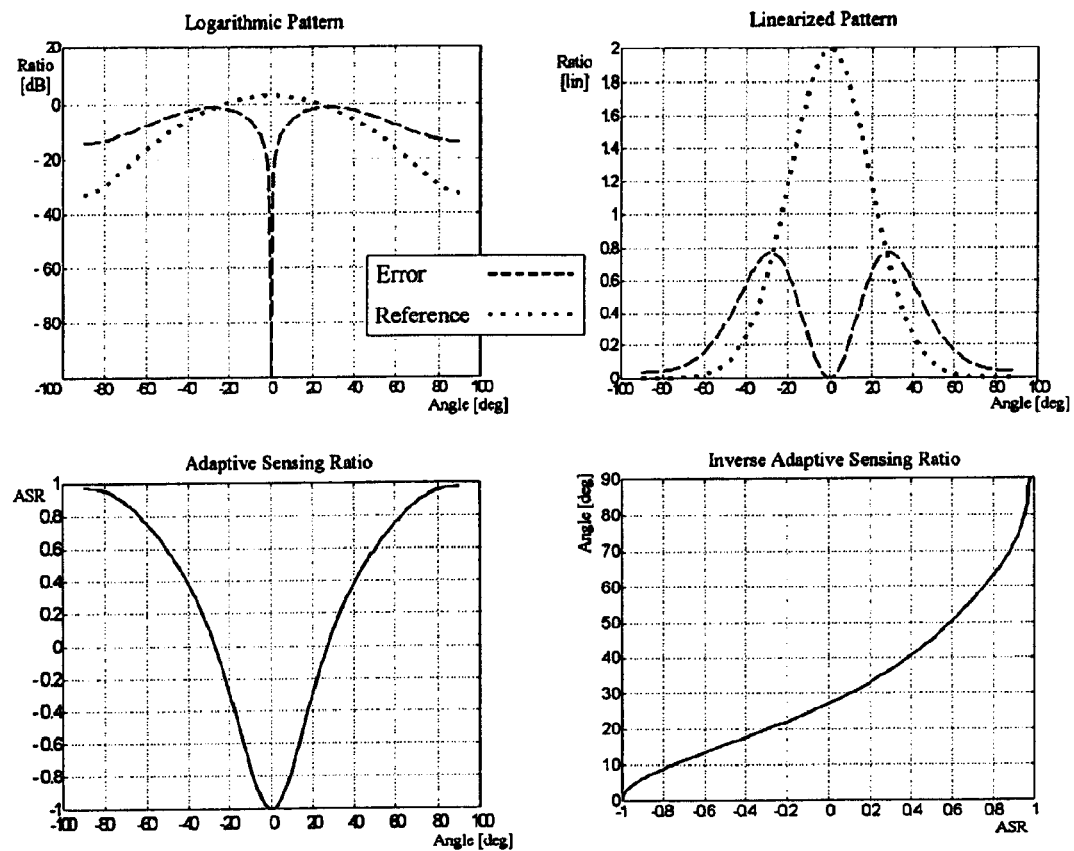
FIG. 4 illustrates a derivation of an inverse ASR function from simulated antenna pattern data.

Thus, the ASR function is directly proportional to the target angle, Θ. Accordingly, the inverse of the ASR function is needed to derive the angle information from the amplitudes of a target. Because the inverse ASR function cannot be described in an unique mathematical equation, it is necessary to build a look-up table with real measured data. A sample derivation of the inverse ASR function from simulated antenna pattern data is illustrated in FIG. 4.

As can be seen above, the ASR function does not provide any information about the sign of Θ. However, the phase characteristics of the antenna patterns may be used to accomplish this. Once a target has been detected and the complex pointers of both error and reference channel are available, the difference in phase (δ) between those two pointers may be calculated.

The following equations illustrate the relationship between δ and Θ:

$$A = a \cdot e^{j(\phi - \Delta)} \qquad \text{Equation 2}$$

where φ =phasing of feed and Δ=retardation, and $$B = b \cdot e^{j(\phi + \partial)} \qquad \text{Equation 3}$$

where δ=phase difference=180°=π, and $$\sin\Theta = \frac{r}{d} \rightarrow r = d \cdot \sin\Theta \Delta = 2 \cdot \pi \cdot \frac{r}{\lambda} \qquad \text{Equation 4}$$

where d=the distance between the antenna components and λ=signal wavelength.

Inserting equation 4 into equation 5 yields:

$$\Delta = 2 \cdot \pi \cdot \frac{d}{\lambda} \cdot \sin\Theta \qquad \text{Equation 6}$$

Inserting equation 6 into equation 2 yields:

$$A = a \cdot e^{j\left(\varphi - 2\pi\frac{d}{\lambda} \cdot \sin\Theta\right)} \qquad \text{Equation 7}$$

When A and B are of equal amplitude, combining equation 7 with equation 3 yields:

$$\begin{aligned}
A + B &= a \cdot e^{j\left(\varphi - 2\pi\frac{d}{\lambda} \cdot \sin\Theta\right)} + a \cdot e^{j(\varphi + \pi)} \qquad \text{Equation 8}\\
&= a \cdot [\cos(\varphi + \pi) + j \cdot \sin(\varphi + \pi)] + \\
&\quad a \cdot \left[\cos\left(\varphi - 2 \cdot \pi \cdot \frac{d}{\lambda} \cdot \sin\Theta\right) + \right.\\
&\quad \left. j \cdot \sin\left(\varphi - 2 \cdot \pi \cdot \frac{d}{\lambda} \cdot \sin\Theta\right)\right]\\
&= a\left[\cos(\varphi + \pi) + \cos\left(\varphi - 2 \cdot \pi \cdot \frac{d}{\lambda} \cdot \sin\Theta\right) + \right.\\
&\quad \left. j\left(\sin(\varphi + \pi) + \sin\left(\varphi - 2 \cdot \pi \cdot \frac{d}{\lambda} \cdot \sin\Theta\right)\right)\right]
\end{aligned}$$

where the phase component of equation 8 is:

$$\arctan\frac{\sin(\varphi + \pi) + \sin\left(\varphi - 2 \cdot \pi \cdot \frac{d}{\lambda} \cdot \sin\Theta\right)}{\cos(\varphi + \pi) + \cos\left(\varphi - 2 \cdot \pi \cdot \frac{d}{\lambda} \cdot \sin\Theta\right)} \qquad \text{Equation 9}$$

where, when φ=0 and d/λ≅½, then equation 9 simplifies to:

$$\arctan\frac{\sin(-\pi \cdot \sin\Theta)}{\cos(-\pi \cdot \sin\Theta) - 1} \qquad \text{Equation 10}$$

Figure 5:
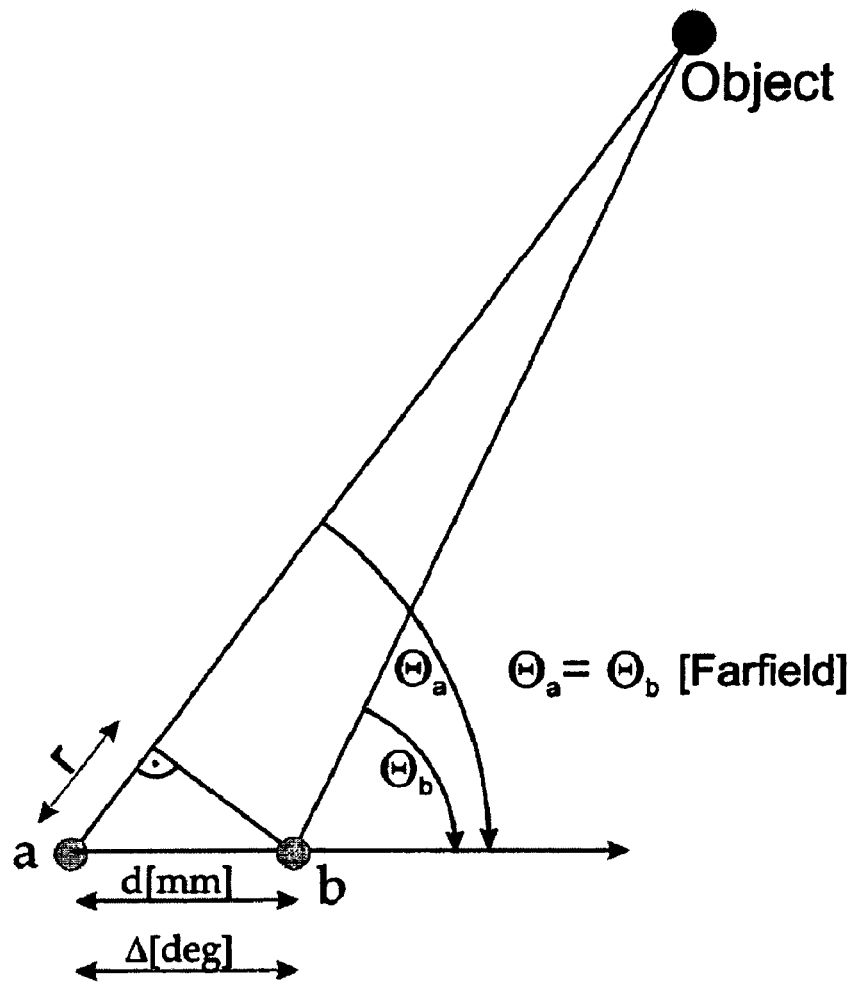
FIG. 5 illustrates the calculation of the bearing of an object.

These calculations are illustrated in the diagram shown in FIG. 5.

Figure 6:
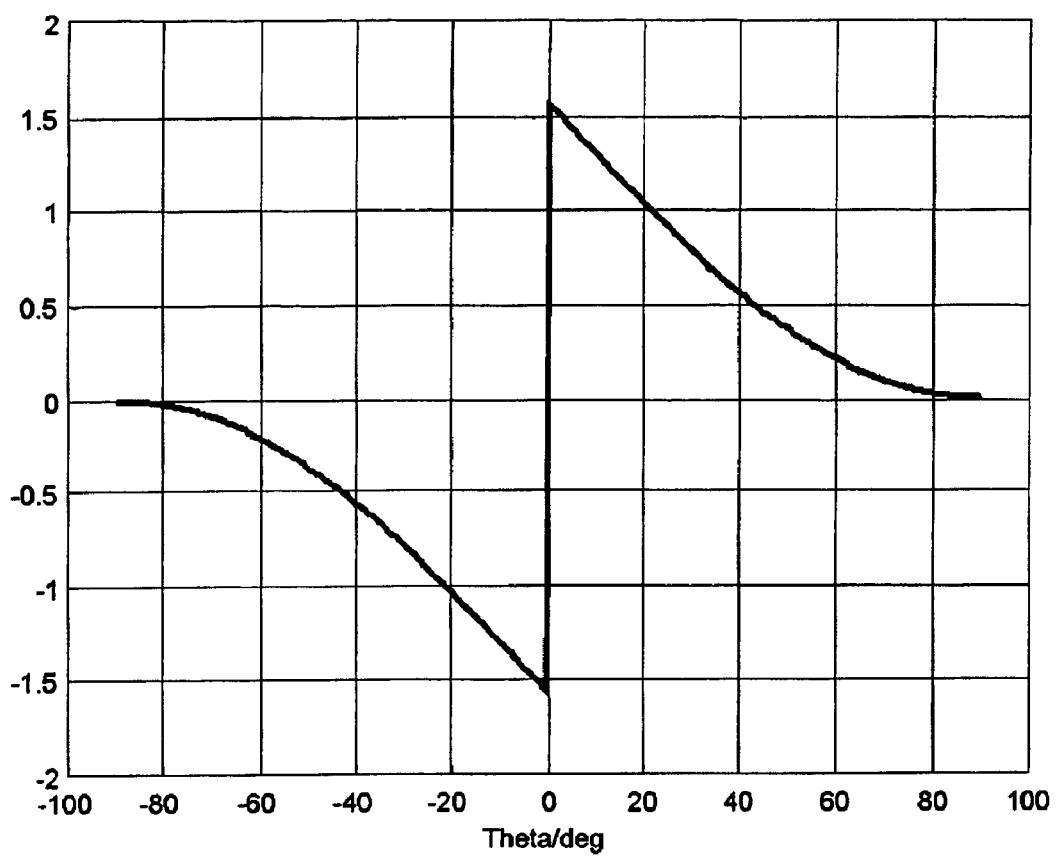
FIG. 6 illustrates phase difference versus error angle.

Equation 10 illustrates that the sign of the phase difference indicates the sign of the target's angle. This is shown graphically in FIG. 6. Thus, the bearing information for a target object may be determined completely by determining the amplitude of the monopulse signal, and then determining the sign of the target's angle using the phase difference between the first phase signal and the second phase signal, such as in the manner described above.

The invention provides numerous advantage over the systems of the prior art. For example, the invention provides advantages over other forms of monopulse radar with minimum impact to the HRR sensor architecture itself. In addition, less board space is required to add the bearing functionality.

While the invention has been described by illustrative embodiments, additional advantages and modifications will occur to those skilled in the art. Those of ordinary skill in the art should appreciate that variations to and modification of the invention, including but not limited to wireless communication between and among any of the components referred to herein or equivalent. For example, other applications that may be used with this system include automatic doors, sanitary facilities, ground speed indication, automotive blind spot and parking aid sensors, electronic fences, security systems, navigation devices, and altimetry. This list is for purposes of example and is not intended to be in any way exhaustive. The invention in its broader aspects is not limited to specific details shown and described herein. Modifications, for example, to type and number of antenna, controllers, signal splitters, phase shifters, and sample points may be made without departing from the spirit and scope of the invention. Accordingly, it is intended that the invention not be limited to the specific illustrative embodiments, but be interpreted within the full spirit and scope of the appended claims and their equivalents.

What is claimed is:

1. A sensor system for detecting an object comprising:
   a signal source for generating source signal;
   an antenna system for transmitting said source signal to and receiving a reflected signal from said object; wherein said antenna system is configured for introducing a phase shift into said source signal to create a plurality of transmitted signal patterns; and
   an information processor programmed to receive said reflected signal and to determine bearing information for said object based on position and phase information in said plurality of transmitted signal patterns.

2. A sensor system for detecting an object comprising:
   a signal source for generating source signal;
   an antenna system for transmitting said source signal to and receiving a reflected signal from said object; wherein said antenna system is configured for introducing a phase shift into either said source signal or said reflected signal to create a plurality of signal patterns; and
   an information processor programmed to receive said reflected signal and to determine bearing information for said object based on position and phase information in said plurality of signal patterns,
   wherein said antenna system comprises:
   a signal splitter for splitting said source signal into at least a first portion and a second portion;
   at least a first antenna for receiving said first portion of said source signal and transmitting a first signal;
   at least a second antenna for receiving said second portion of said source signal and transmitting a second signal; and
   a phase shifter for switching between providing at least said second portion of said source signal to said second antenna in phase with said first portion of said source signal and shifting at least said second portion of said source signal in phase relative to said first portion of said source signal by a predetermined amount to produce a reference signal pattern and an error signal pattern.

3. A sensor system for detecting an object comprising:
   a signal source for generating source signal;
   an antenna system for transmitting said source signal to and receiving a reflected signal from said object; wherein said antenna system is configured for introducing a phase shift into either said source signal or said reflected signal to create a plurality of signal patterns; and
   an information processor programmed to receive said reflected signal and to determine bearing information for said object based on position and phase information in said plurality of signal patterns,
   wherein said antenna system comprises:
   at least a first antenna for receiving said reflected signal and generating a first signal portion based thereon;
   at least a second antenna for receiving said reflected signal and generating a second signal portion based thereon;
   a phase shifter for switching between providing said second portion of said reflected signal in phase with said first portion of said reflected signal and shifting said second portion of said source signal in phase relative to said first portion of reflected signal by a predetermined amount to produce a reference signal pattern and an error signal pattern; and
   a signal combiner for recombining said at least first portion and a second portion into said reflected signal.

4. The sensor system of claim 2, wherein said first antenna and/or said second antenna comprises at least one antenna array.

5. The sensor system of claim 1, wherein said signal source comprises:
   a signal driver for generating a drive signal;
   a pulsed modulator for receiving said drive signal; and
   a continuous waves source for generating a continuous wave signal; wherein said continuous wave signal is mixed with said drive signal in said pulsed modulator to generate said source signal for said antenna system.

6. The sensor system of claim 5, wherein said signal source further comprises a band pass filter filtering said source signal from said pulsed modulator before it is received by said antenna system.

7. The sensor system of claim 5, wherein said signal source further comprises:
   a quadrature power splitter for receiving said reflected signal pulses and for splitting said reflected signal pulses into at least a first reflected signal and a second reflected signal, wherein said quadrature power splitter shifts said second reflected signal in phase by about 90°;
   a first mixer for combining said first reflected signal with said continuous wave signal; and
   a second mixer for combining said second reflected signal with said continuous wave signal.

8. The sensor system of claim 7, wherein said information processor is programmed to calculate said bearing information for said object by:
   determining a reference amplitude and phase and an error amplitude and phase from said reflected signal;
   determining a phase difference between said reference phase and said error phase, said phase difference having a sign of positive or negative, or a phase difference of zero;
   calculating said bearing information using said reference amplitude, said error amplitude, and said sign of said phase difference.

9. The sensor system of claim 1, wherein said information processor comprises a digital signal processor.

10. The sensor system of claim 1, wherein said predetermined phase difference is a relative phase difference of about 180°.

11. A sensor system for detecting an object comprising:
    a signal source for generating source signal;

an antenna system for transmitting said source signal toward said object and receiving a reflected signal therefrom, wherein said antenna system includes:
- at least a first antenna for transmitting and/or a first signal portion of said source and/or said reflected signal;
- at least a second antenna for transmitting and/or a second signal portion of said source and/or said reflected signal;
- a phase shifter for switching between providing said second signal portion in phase with said first signal portion and shifting said second portion in phase relative to said first signal portion by a predetermined amount to produce a reference signal pattern and an error signal pattern; and
- an information processor programmed to receive said reflected signal and to determine bearing information for said object based on position and phase information in said reference and error signal patterns.

12. The sensor system of claim 11, wherein said first antenna and/or said second antenna comprises at least one antenna array.

13. The sensor system of claim 11, wherein said signal source comprises:
- a signal driver for generating a drive signal;
- a pulsed modulator for receiving said drive signal; and
- a continuous waves source for generating a continuous wave signal; wherein said continuous wave signal is mixed with said drive signal in said pulsed modulator to generate said source signal for said antenna system.

14. The sensor system of claim 13, wherein said signal source further comprises a band pass filter filtering said source signal from said pulsed modulator before it is received by said antenna system.

15. The sensor system of claim 13, wherein said signal source further comprises:
- a quadrature power splitter for receiving said reflected signal pulses and for splitting said reflected signal pulses into at least a first reflected signal and a second reflected signal, wherein said quadrature power splitter shifts said second reflected signal in phase by about 90°;
- a first mixer for combining said first reflected signal with said continuous wave signal; and
- a second mixer for combining said second reflected signal with said continuous wave signal.

16. The sensor system of claim 15, wherein said information processor is programmed to calculate said bearing information for said object by:
- determining a reference amplitude and phase and an error amplitude and phase from said reflected signal;
- determining a phase difference between said reference phase and said error phase, said phase difference having a sign of positive or negative, or a phase difference of zero;
- calculating said bearing information using said reference amplitude, said error amplitude, and said sign of said phase difference.

17. The sensor system of claim 11, wherein said information processor comprises a digital signal processor.

18. The sensor system of claim 11, wherein said predetermined phase difference is a relative phase difference of about 180°.

19. A method for calculating bearing information for an object, the method comprising the steps of:
- receiving a signal reflected from said object, wherein said signal has a reference signal pattern and an error signal pattern produced by introducing a predetermined phase shift into a portion of said signal;
- determining a reference amplitude and phase and an error amplitude and phase from said signal;
- determining a phase difference between said reference phase and said error phase, said phase difference having a sign of positive or negative, or a phase difference of zero;
- calculating said bearing information using said reference amplitude, said error amplitude, and said sign of said channel phase difference.

20. The method of claim 19, wherein said predetermined phase shift is about 180°.

* * * * *